United States Patent Office 3,533,105
Patented Oct. 6, 1970

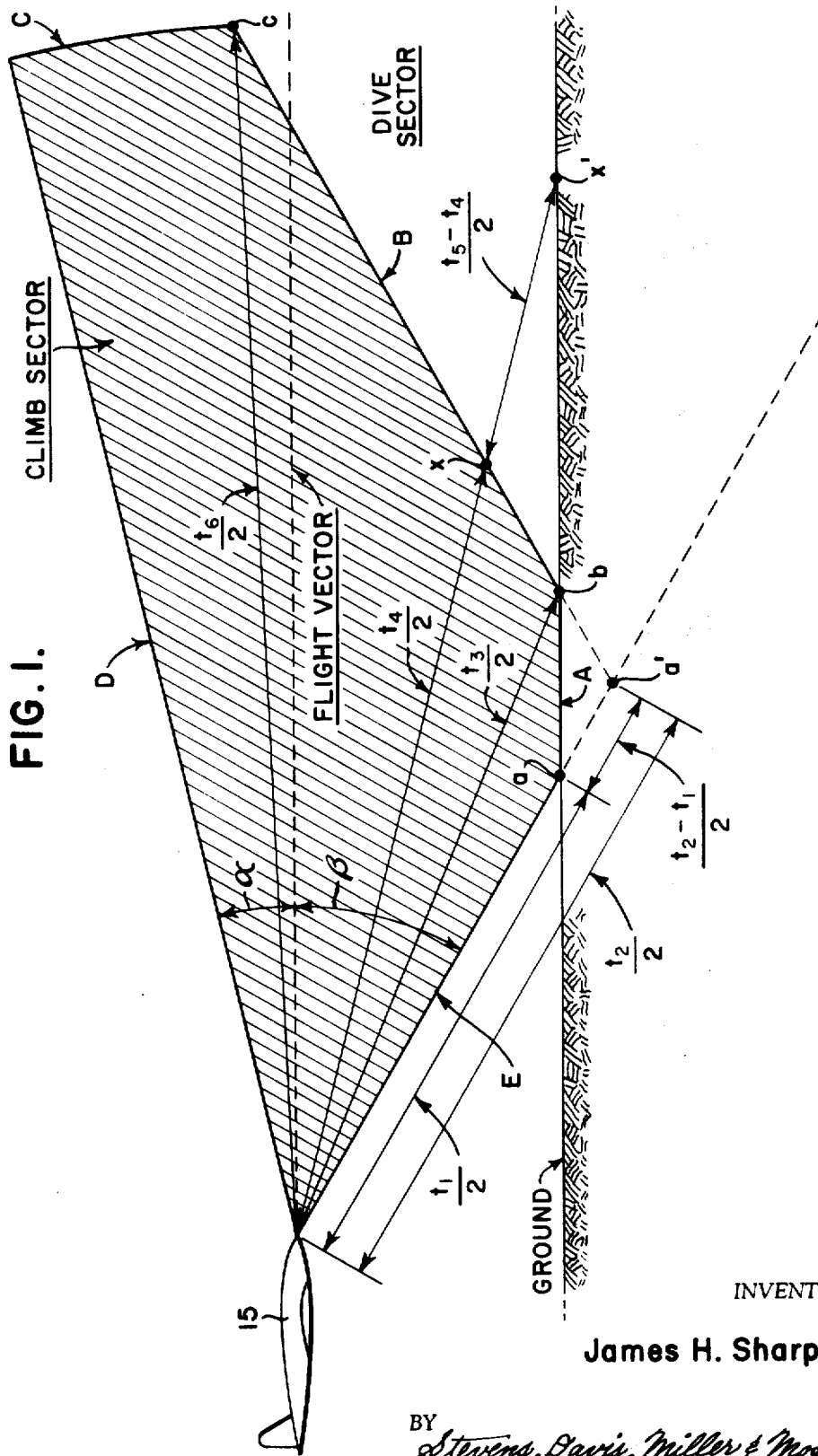

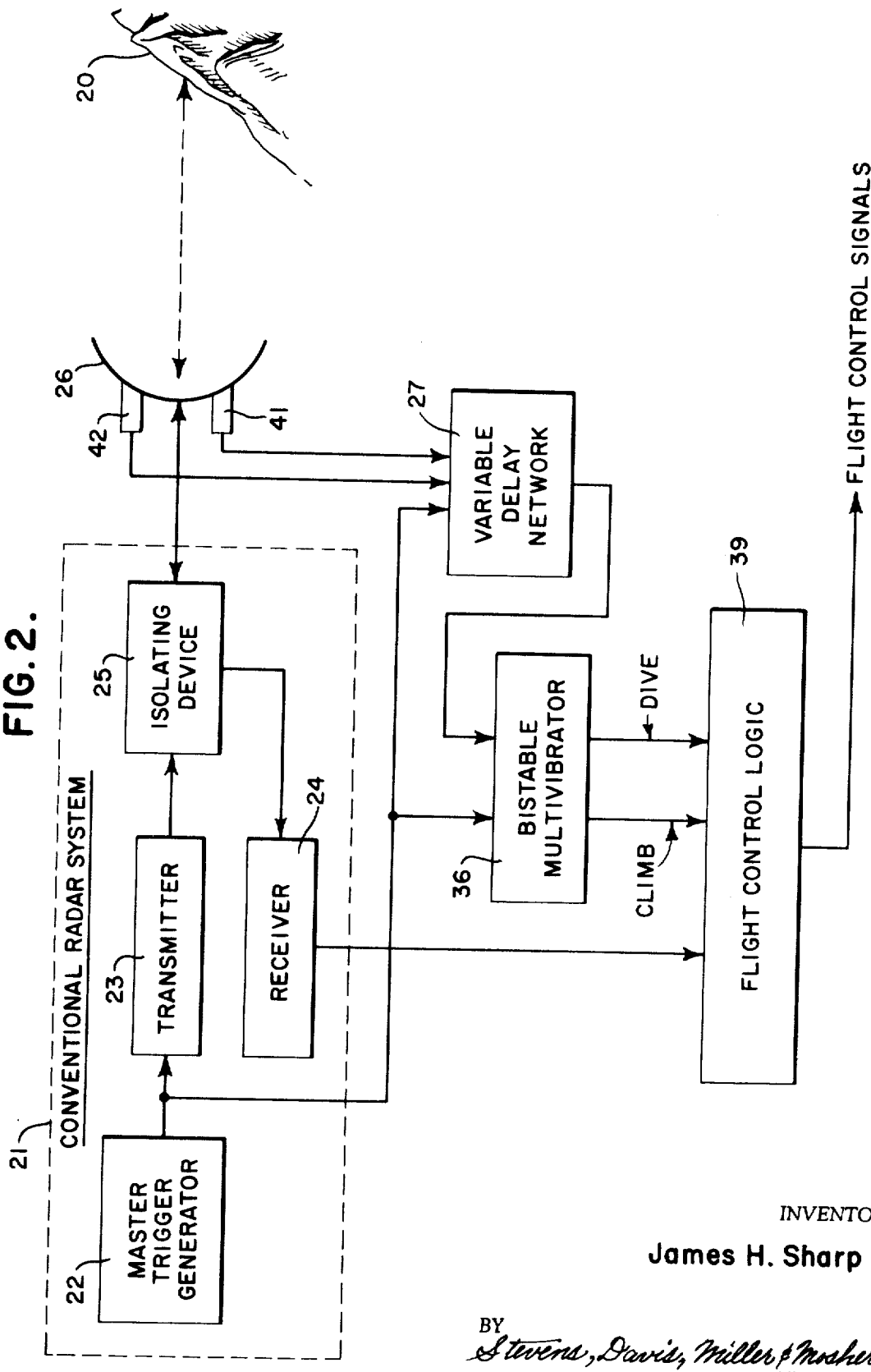

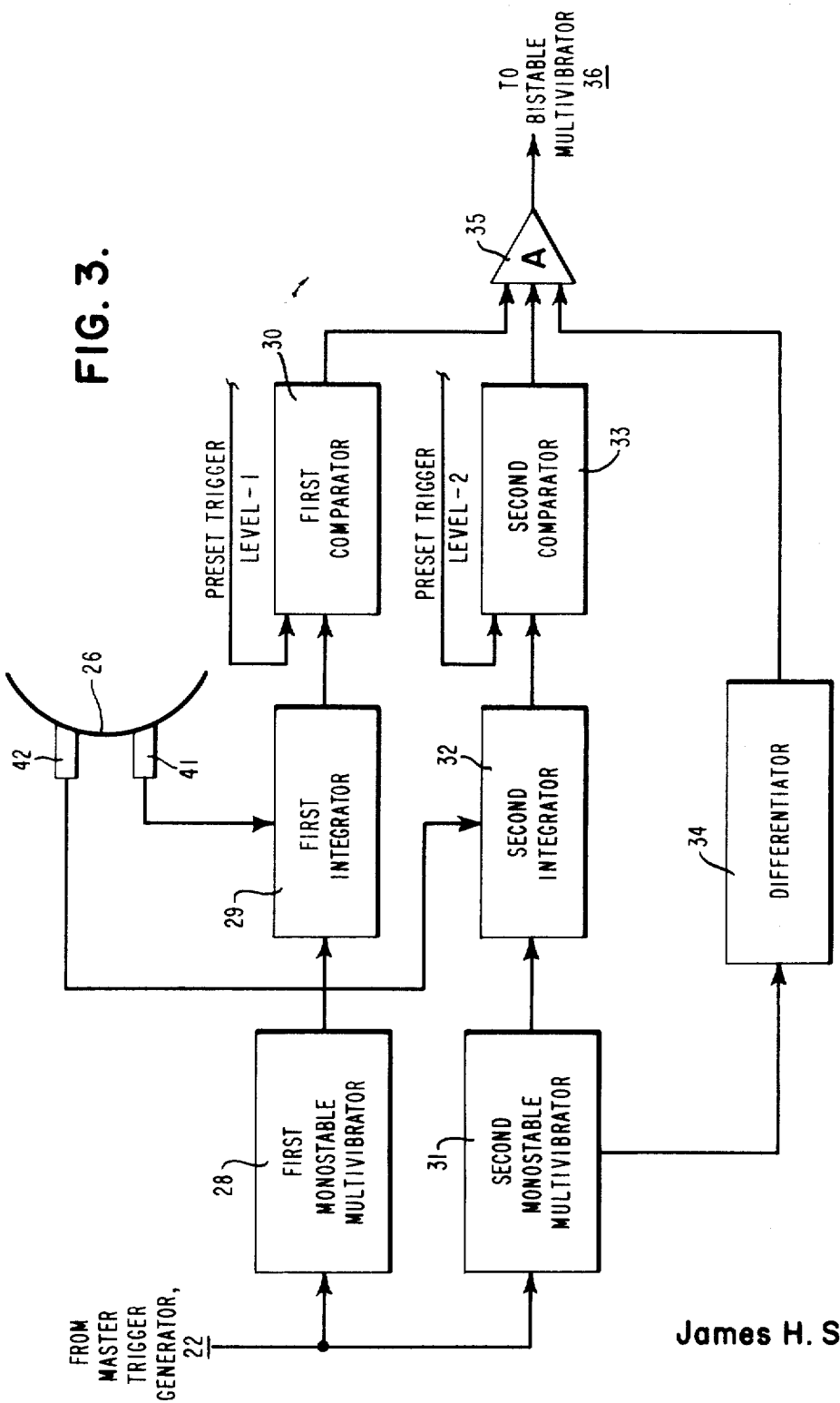

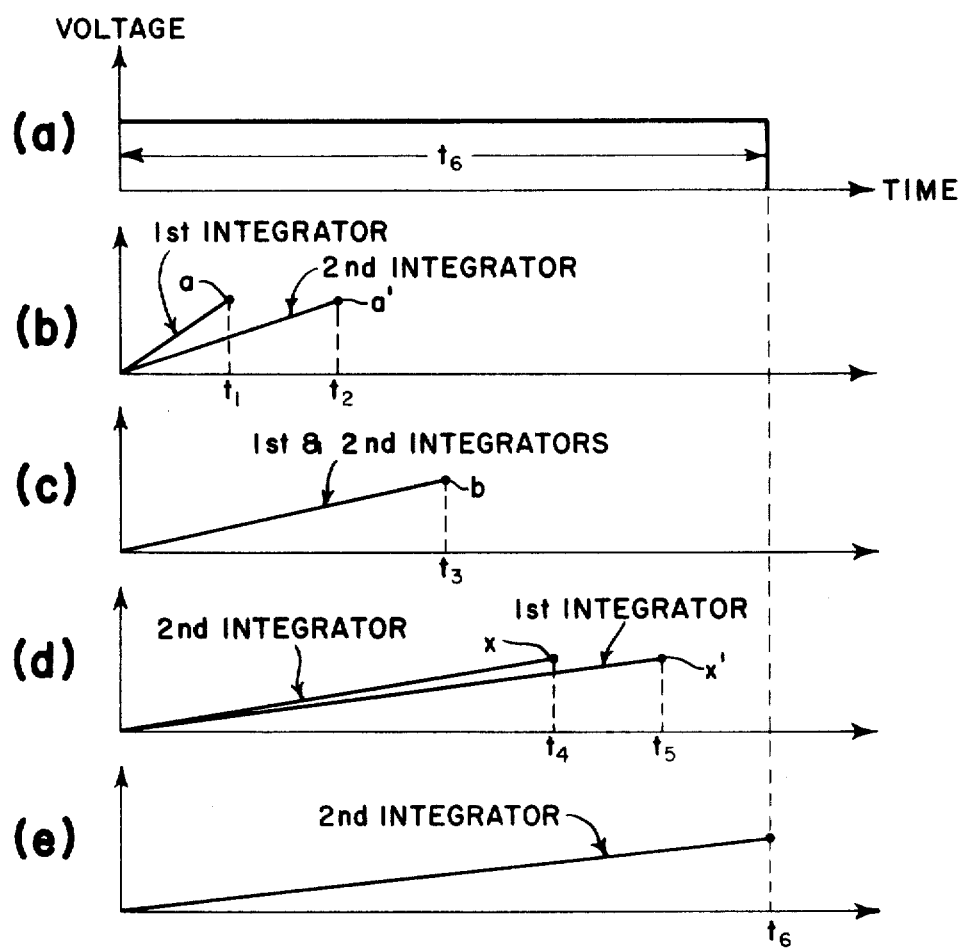

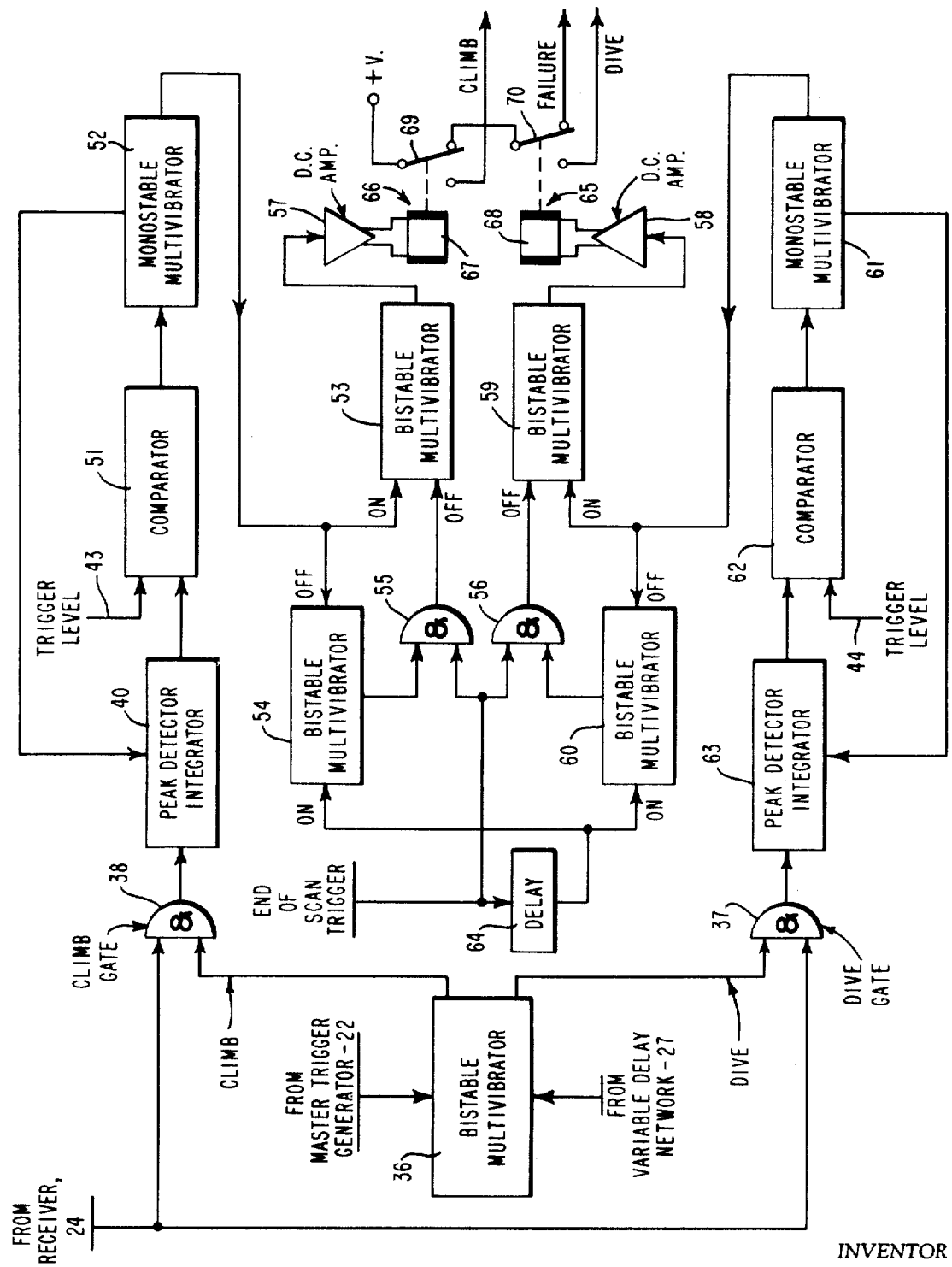

3,533,105
TERRAIN AVOIDANCE RADAR SYSTEM
James H. Sharp, Dallas, Tex., assignor to Texas Instruments Incorporated, Dallas, Tex., a corporation of Delaware
Filed Dec. 29, 1961, Ser. No. 163,359
Int. Cl. G01s 9/20; B64c 13/20
U.S. Cl. 343—7                              17 Claims The present invention relates to radar systems and more particularly relates to a terrain avoidance system for monitoring and detecting terrain and other obstacles in the path of an airborne vehicle and automatically programming the flight of the vehicle to avoid the detected obstacles.

Radar systems which are intended for installation in aircraft to automatically control its flight path must meet many severe requirements. Not only must such systems possess a high degree of dependability, but they must also have relatively low complexity, light weight, and small size. Above all, the systems must fulfill their intended functions in all respect with a minimum possibility of failure.

The basic consideration in the operation of a terrain avoidance radar system is that of maintaining the airborne vehicle at a prescribed altitude above the terrain or obstacles arising therefrom under all conditions. In order to accomplish this result, the terrain avoidance radar system must maintain the airborne vehicle within prescribed altitude limits over level terrain, detect obstacles in the path of the vehicle in a sufficiently short period of time to permit the vehicle to obtain the desired altitude above the obstacle, and yet allow sufficient time to prevent undue stressing of the structural members of the airborne vehicle. After passing by the obstacle, the system must be able to return the vehicle to the proper altiude relative to new conditions. All obstacles in the flight path of the vehicle must be monitored until they are of no further interest, so far as the flight path of the vehicle is concerned, and the radar system must locate new obstacles and produce the required responses to them as dictated by the particular terrain encountered. Thus, the system must be able to monitor all obstacles at all times over its entire range of operation. Further, the system must be able to utilize, to the extent possible, existing systems in the airborne vehicle in order to minimize the additional equipment required.

It is a principal object of the present invention to provide a terrain avoidance radar system for airborne vehicles which best satisfies all of the above enumerated requirements.

It is a further object of the present invention to provide a relatively simple, light weight, and compact automatic terrain avoidance system which is highly dependable and which is completely compatible with the existing radar equipment employed in both drone and manned aircraft.

It is another object of the present invention to provide a terrain avoidance radar system for airborne vehicles which will continually monitor an obstruction in the path of the vehicle and which will generate the appropriate control action from the time the obstruction first comes into the range of the radar until it is no longer of any interest with regard to the safety of the airborne vehicle.

It is a still further object of the present invention to provide a terrain avoidance radar system for aircraft which detects the presence of obstacles located within a unique predetermined radar scan profile, or template, and which automatically causes the aircraft to climb when an obstacle is detected within the scan profile and effects a descent of the aircraft when an object is not detected within the predetermined scan profile.

It is a still further object of the present invention to provide a terrain avoidance radar system which continually monitors its own operability and which immediately provides a warning signal in the event of a malfunction of the radar.

In accordance with the objectives set forth above, the terrain avoidance radar system of the present invention comprises means for sending radar signals into a predetermined region in front of an airborne vehicle to detect the presence of an obstacle in the predetermined region, at least a portion of the boundary for the predetermined region lying at a distance from the airborne vehicle which varies in accordance with its angular position with respect to the airborne vehicle, means for receiving the return radar signals, a flight control logic network for deriving from the received radar signals "Climb" and "Dive" flight control command signals to control the flight path of the airborne vehicle so as to avoid the detected obstacles, a bistable multivibrator for controlling the generation of the flight control command signals in the flight control logic network, means for placing the bistable multivibrator in its first stable state when a radar pulse is emitted into the predetermined region, and a variable time delay network for applying timing pulses to the bistable multivibrator to place it in its second stable state after sufficient time has elapsed for the radar pulse to travel to a point on the boundary for the predetermined region and back to the airborne vehicle. The "Climb" command signal is generated when an obstacle is detected within the predetermined region, while the "Dive" command signal is produced when an obstacle is detected outside of the predetermined region.

Other and further objects, advantages, and characteristic features of the present invention will become readily apparent from consideration of the following detailed description of preferred embodiments of the invention when taken in conjunction with the appended drawings in which:

FIG. 1 is a vertical profile diagram illustrating the profile, or template, scanned by the radar antenna of the terrain avoidance system of the present invention;

FIG. 2 is a simplified block diagram of the system of the invention;

FIG. 3 is a block diagram of the elements comprising the variable delay network of FIG. 2;

FIGS. 4(a)–(e) illustrate exemplary waveforms which are used in explaining the operation of the variable delay network of FIG. 3; and FIG. 5 is a block diagram of the elements comprising the flight control logic of FIG. 2.

Referring to FIG. 1 of the accompanying drawings, there is illustrated a diagram which will be used in describing the basic functioning of the system of the present invention. An aircraft 15, and in this particular embodiment of the invention the aircraft is taken to be a drone, is to be automatically maintained by the system of the invention essentially at a predetermined altitude above the surface of the surrounding terrain, designated as "ground" in FIG. 1. The aircraft 15 is provided with an antenna for transmitting and receiving pulses of electromagnetic energy. The antenna transmits pulses at a predetermined repetition rate, which for purposes of illustration is stated to be 4.0 kilocycles per second, and is swept through a predetermined vertical scan, of for example, from an angle of $\beta$ below the flight vector of the aircraft to an angle of $\alpha$ above the flight vector. In a practical system constructed according to the principles of the present invention $\beta$ might be around $-12°$, while $\alpha$ would be about $+10°$. The antenna scan is, of course, referenced or stabilized to the flight vector of the aircraft.

The antenna moves through a complete scan cycle, i.e., from its lower limit to its upper limit and then back to its lower limit of movement at a predetermined rate, which for purposes of example is taken to be two cycles per second. Thus, the antenna scans a predetermined sector in front of the aircraft four times each second, twice during its upward movement and twice on its downward movement. A typical maximum range of the radar, i.e., from the aircraft 15 to the curved front C of the scan profile, may be around 15,000 feet, when the aircraft is maintained at an altitude of between 200 and 1500 feet above the surrounding terrain.

The scan profile is shown in FIG. 1. The upper limit of the profile is defined by the line D extending from the aircraft 15 at a predetermined angle α above the flight vector of the aircraft. The maximum extent, or range, of the scan is determined by the curved line C which defines an arc of a circle whose center lies at the antenna on the aircraft 15 and whose radius is equal to the distance from the aircraft 15 to the arc C. The lower limit of the scan profile is defined by three lines. Line B, which intersects the arc C at a point "c" slightly above the flight vector of the aircraft, is disposed at a relatively small angle with respect to the flight vector and extends from line C almost parallel to line D until it intersects the ground at point "b." The distance from the aircraft to point "c" is such that the travel time of a radar pulse from the aircraft 15 to point "c" is equal to $t_6/2$, while the travel time of a pulse from the aircraft to point "b" is $t_3/2$. Line A extends along the terrain, which for purposes of illustration will be assumed to be level ground, from point "b" to a point "a" which is located at a distance from the aircraft corresponding to a radar pulse travel time of $t_1/2$. Line E, which is disposed between the radar antenna on the aircraft and point "a," extends from the aircraft at a predetermined angle β below the flight vector of the aircraft.

The area in the scan profile which is enclosed by the lines ABCDE is designated as the "Climb Sector," and if the radar locates any object within the sector, a command is generated and sent to the autopilot to program a climb for the aircraft. The area outside of the profile ABCDE is termed the "Dive Sector," and when an object is detected in the "Dive Sector" and no objects are detected in the "Climb Sector," a dive command signal is generated which programs a descent for the aircraft. If no objects at all are detected by the radar, a signal is generated to indicate a possible failure, or malfunction, of the system.

Referring now to FIG. 2, it may be observed that the system of the present invention comprises a conventional radar system designated generally by the dashed line 21 which operates in conjunction with a conventional radar antenna 26. A unique variable delay network 27 functions to insure that the desired scan profile, or template, is being scanned by the radar. Signals from the conventional radar system 21 and from the variable delay network 27 are used to control the state of a bistable multivibrator 36 which, in conjunction with the return radar signals, controls the generation of "Climb" and "Dive" flight control command signals in a flight control logic network 39. The return radar pulses received by the conventional radar system 21 and fed to the flight control logic 39 are thus coordinated with the scan profile signals from the variable delay network 27 and the bistable multivibrator 36 to derive the proper flight control command signals to maintain the aircraft or missile in a low flight over ground terrain while avoiding abrupt projections of the ground terrain.

The radar system 21 may comprise any conventional radar system suitable for use in conjunction with the terrain avoidance system of the present invention, although in a preferred embodiment of the invention a monopulse resolution improvement radar (MRI) is preferred. Such a system comprises a pulse repetition frequency (PRF) controlled master trigger generator 22 which activates a transmitter 23 to initiate the emission of the radar pulses which are fed through an isolating device 25 to a conventional radar antenna 26. The isolating device 25 is used to prevent the transmitted pulses from being sent to the receiver and may comprise conventional means for such purposes, for example, a circulator or a blanking pulse generator. The pulsing of the transmitter 23 causes a radar carrier signal pulse to be transmitted from the conventional radar antenna 26, and the electromagnetic energy radiated from the antenna 26 travels through space until striking an object 20, which may be terrain or other obstacles. The object 20 will cause a reflected pulse of the carrier to be received by the antenna 26 and sent via the isolating device 25 to the receiver 24.

At the same time that the master trigger generator 22 pulses the transmitter 23 to initiate the emission of a radar pulse, the trigger generator also pulses the variable delay network 27 to initiate its operation and sets the bistable multivibrator 36 to that state in which an output signal is provided on its "Climb" output. The variable delay network 27 then passes through its operation cycle to produce a predetermined variable time delay depending upon what portion of the template is presently being scanned by the radar antenna 26. At the completion of the time delay, a pulse is emitted from the variable delay network 27 to set the bistable multivibrator 36 to its other stable state, in which the "Dive" output is activated. Thus, if a return pulse from the object 20 is received by the radar system and sent to the flight control logic network 39 while the bistable multivibrator provides a "Climb" output, this will indicate that the object 20 lies within the scan profile ABCDE of FIG. 1, and the flight control logic 39 will generate a flight control signal commanding the aircraft or missile to climb. On the other hand, if the object 20 lies outside of the scan profile, the time required for the radar pulse to travel from the antenna 26 to the object 20 and back will be greater than the time delay provided by the variable delay network 27. For this case the bistable multivibrator 36 will have been switched to the "Dive" state prior to the receipt of the return radar pulse, and thus when a signal indicating receipt of a return pulse from the object 20 is applied to the flight control logic 39, the flight control logic 39 will generate a "Dive" command because the object 20 lies outside of the scan template. It will now be apparent that the variable delay network 27 provides a time relay which coincides with the time required for an emitted radar pulse to travel from the aircraft to the extremity of the scan profile and back to the aircraft, and of course, this delay will vary in accordance with the distance from the aircraft to the edge of the scan profile as the antenna sweeps from its lower extremity of scan at −β to its upper scan extremity at +α.

The variable delay network 27 will now be described in more detail with specific reference to FIG. 3, and its manner of operation in producing the controllably variable delay will be explained. The variable delay network 27 comprises two main signal channels, the first including a first monostable multivibrator 28, a first integrator 29, and a first comparator 30; while the second channel includes a second monostable multivibrator 31, a second integrator 32, and a second comparator 33. The monostable multivibrators 28 and 31 are conventional blocking oscillators which have only a single stable state so that when an input pulse is applied, the multivibrator will provide a high voltage output for a selected interval of time, after which it will automatically return to its stable state in which the high voltage output is no longer present. The integrators 29 and 32 are conventional RC integrating networks, and since step voltage waveforms from the monostable multivibrators 28 and 31 are applied to their respective inputs, the integrators 29 and 32 will produce essentially ramp voltage outputs. The comparators 30 and 33 are also conventional, and each functions to compare its input voltage from the respective integrator with a preset reference voltage. The preset reference voltages are designated as "Preset Trigger Level 1" for the comparator 30 and "Preset Trigger Level 2" for the comparator 33. As long as the voltage applied to the preset trigger level is greater than the voltage furnished by the respective integrator, no output will be provided by the comparator. However, when the ramp voltage from the integrator increases to the point where it equals the preset trigger reference voltage, the comparator will then provide an output pulse. The output pulses from the comparators 30 and 33 are fed to an amplifier 35 in order to bring their magnitudes up to desired levels. It should be apparent, however, that the amplifier 35 would not be necessary if comparators were used which could furnish output voltages of the desired magnitudes.

Potentiometers 41 and 42 are connected as part of the resistance elements in the respective RC integrating circuits 29 and 32, and the respective taps on the potentiometers 41 and 42 are moved in accordance with the position of the antenna 26. Thus, the time constants for the respective integrators 29 and 32 are changed as a function of the movement of the antenna 26. More specifically, as the antenna 26 moves upward in its scan, the resistances in the RC integrating circuits are increased so that longer times are required for the respective ramp voltages to reach the predetermined reference trigger voltage levels applied to the comparators 30 and 33.

A differentiator circuit 34 is connected to the output of the second monostable multivibrator 31 and serves to differentiate the trailing edge of the output from multivibrator 31 to produce a sharp timing pulse for the constant range portion of the scan template when the multivibrator 31 returns to its stable state. The output from the differentiator 34 is sent via the amplifier 35 to the bistable multivibrator 36.

The operation of the variable delay network of FIG. 3 will now be described. It should be kept in mind that the scan template ABCDE of FIG. 1 provides an outline of the ranges within which it is desired that no terrain or obstacles project relative to the aircraft 15. The extremities, or outer ranges, of the scan template are represented by the straight line A, the straight line B and the curved line C. Thus, it will be apparent that in order to achieve the desired scan profile, the delay provided by the variable delay network 27 must be changed at a first rate while the outer limit of scan is moving along the line A, then must be shifted at a greater rate while the scan limit travels along the line B, and then must be maintained constant while the antenna scans along the arc C.

The voltage waveforms produced by different parts of the variable delay network of FIG. 3 are illustrated in FIG. 4. More specifically, output voltages from the monostable multivibrators 28 and 31 are shown in FIG. 4(a), and it will be apparent that these voltages are present for a time designated as $t_6$, which is the time required for a radar pulse to travel from the aircraft 15 to the arc C and back to the aircraft. It should be pointed out that in order to promote simplicity in describing the operation of the variable delay network, it will be assumed that the outputs from the respective multivibrators 28 and 31 are present for the same duration of time. However, this is not necessary for the operation of the system and, in fact, designing the system with different time constants for the respective monostable multivibrators 28 and 31 is well within the purview of the invention.

The trigger pulse from the master trigger generator 22 which causes the transmission of a radar pulse from the antenna 26 also triggers the monostable multivibrators 28 and 31 to initiate the waveforms shown in FIG. 4(a). The integrators 29 and 32 integrate the step waveforms of FIG. 4(a) to produce the ramp voltages illustrated in FIG. 4(b). The time constants of the respective integrators are different, with the time constant of the integrator 32 initially being longer than the time constant of the integrator 29. Thus, the output voltage from the integrator 29 reaches its predetermined reference level "$a$" at time $t_1$, whereas the output voltage from the second integrator 32 reaches its predetermined comparison level "$a'$" at a later time $t_2$. Again, the predetermined reference levels (designated as "Present Trigger Level 1" and "Preset Trigger Level 2" for the first and second comparators, respectively) will be assumed to be equal in order to promote simplicity in describing the operation of the system. However, it should be obvious that the preset trigger levels do not have to be the same.

The time $t_1$ is that time required for a radar pulse to travel from the aircraft 15 to the point "$a$" of FIG. 1 and back to the aircraft, and "Preset Trigger Level 1" for the comparator 30 is set so that the comparator 30 is triggered at time $t_1$. At this time the comparator 30 produces an output pulse which is applied via the amplifier 35 to the bistable multivibrator 36 to set the bistable multivibrator 36 to the "Dive" state. At time $t_2$, which is the time required for the radar pulse to travel from the aircraft 15 to point "$a'$" and back to the aircraft, the output voltage from the second integrator reaches the level of the reference voltage applied to "Preset Trigger Level 2" on the second comparator 33, and at this time the second comparator 33 produces an output pulse. However, since the bistable multivibrator 36 has already been set to the "Dive" state, the output pulse from the second comparator 33 will have no effect.

As the radar antenna 26 begins to sweep upward from its initial angle of $-\beta°$ with respect to the flight vector of the aircraft, the movement of the radar antenna is made to effect desired corresponding movements of the taps on the potentiometers 41 and 42. This increases the resistance values in the RC integrators 29 and 32, thereby increasing the time constants of the integrators. The resistance values and the potentiometer tap movements are made such that the time constant of the first integrator 29 is caused to increase at a faster rate than that of the second integrator 32. The reason for this is that the change in the time constant for the first integrator 29 corresponds to a movement of the scan limit along the line A (from point "$a$" to point "$b$"), while the change in the time constant of the second integrator 32 corresponds to a sweep along the dashed extension of line B (from point "$a'$" to point "$b$").

When the position of the antenna is such that radar pulses are being beamed toward point "$b$," the time constants for the first and second integrators have become identical, as is shown in FIG. 4(c). The time required for a radar pulse to travel from the aircraft to point "$b$" and back is $t_3$. At this point both the first and second comparators 30 and 33, respectively, reach their preset comparison levels at the same time, namely at $t_3$.

As the radar antenna continues on its upward sweep, the time constant for the first integrator 29 increases at a faster rate than the time constant for the second integrator 32, and the second integrator 32 will reach its preset comparison voltage level first. This condition is illustrated in FIG. 4(d). For the specific case illustrated, radar pulses are being beamed toward point "$x$" which lies at a distance from the aircraft 15 corresponding to a radar pulse travel time of $t_4/2$. The second integrator 32 will reach its preset comparison voltage level at time $t_4$ and set the bistable multivibrator 36 to the "Dive" state. At time $t_5$, which is the travel time of a radar pulse from the aircraft to point "$x$" and back, the output voltage from the first integrator 29 will reach its preset comparison level, and the first comparator 30 will then pulse the bistable multivibrator 36. However, this pulse will have no effect because the multivibrator 36 has already been set to the "Dive" state.

As the radar antenna continues its upward scanning movement, it will eventually be beaming pulses at point "$c$." For this case, which is shown in FIG. 4(e), the output voltage from the second integrator 32 reaches its preset comparison level at time $t_6$, which is the travel time of a radar pulse from the aircraft to point "$c$" and back. Thus, the bistable multivibrator 36 is now triggered at time $t_6$.

After the radar antenna has passed through point "c" and continues its upward sweep along line C, the second monostable multivibrator 31 will switch back to its stable state (thus ending its $t_6$ output pulse) before the output from the second integrator 32 has become large enough to trigger the second comparator 33. However, at $t_6$ the differentiator 34 will produce a spike output voltage at the trailing edge of the $t_6$ pulse, and this spike will be fed through the amplifier 35 to set the bistable multivibrator 36 to the "Dive" state. Thus, while the radar antenna is scanning along the arc C, the constant range portion of the scan profile, the bistable multivibrator 36 is switched to the "Dive" state at a constant time $t_6$ after the emission of each radar pulse.

When the radar antenna has reached the upper limit of its scan, i.e., an angle of $+\alpha°$ with respect to the flight vector of the aircraft, the upward movement of the antenna is stopped, and the antenna is caused to move in a downward sweep. The variable delay network 27 will then operate in a manner inverse to that described above, i.e., the time constants for the respective integrators will be decreased in accordance with the downward movement of the antenna, and the appropriate waveforms and timing pulses will be produced so as to cause the outer limit of the scan to move along the arc C, the line B and the line A.

The variable delay network of FIG. 3 may readily be adjusted to change the altitude of the flight vector to be maintained. By adjusting the preset trigger 1 level it is possible to increase or decrease the travel time of the radar pulses from the antenna along the slant range to the perimeter A of the scan profile. Likewise, by adjusting the preset trigger 2 level it is possible to increase or decrease the travel time of the radar pulses from the antenna along the slant range to the perimeter B of the scan profile. Moreover, it should be appreciated that the pulse duration of the monostable multivibrators may be rapidly adjusted by variable resistor or capacitor networks to maintain a desired variable maximum range of the scan profile. By the above adjustments it is believed apparent that the scan profile may be varied according to the desired terrain clearance and maximum range for a particular aircraft.

It will be apparent that the bistable multivibrator 36 (FIG. 1) is caused to change its state at intervals of varying length after the emission of successive pulses from the radar antenna 26. The instant that the bistable multivibrator 36 is switched from the "Climb" to the "Dive" state marks, for the particular range presently being scanned, the time beyond which the terrain offers no danger to the movement of an aircraft or missile thereover.

The flight control logic system 39 is used to generate the signals for controlling the maneuvering of the aircraft or missile over the terrain in accordance with the return radar signals from the receiver 24 and the control signals from the bistable multivibrator 36. Although many types of logic systems may be suitable for this purpose, a preferred embodiment of the flight control logic is shown in FIG. 5. This flight control logic provides an on-off type of control, i.e., when an object is detected within the scan profile a "Climb" command signal is sent to the autopilot, whereas when an object is detected outside of the scan profile a "Dive" command is given. In the absence of either a "Climb" command signal or a "Dive" command indication, a signal will be generated to indicate a failure or malfunction of the system.

The flight control logic system of FIG. 5 includes a "Climb" channel for generating the "Climb" command signals and a "Dive" channel for generating the "Dive" command signals. The input to the "Climb" channel comprises a "Climb" AND gate 38 to which is fed the return radar pulses from the receiver 24 and a signal from the "Climb" output of the bistable multivibrator 36. The output from the "Climb" gate 38 is applied to a peak detecting integrator circuit 40, which may be a conventional RC integrating circuit. For example, the circuit 40 may be a series circuit of a diode, resistor and capacitor to ground with the output taken from the capacitor. The output from the peak detecting integrator 40 is fed to one input of a comparator circuit 51, which may be of the same type as the first and second comparators 30 and 33 of FIG. 3. The other input to the comparator 51, termed "Trigger Level" is provided on a lead 43 to which is fed that reference voltage at which it is desired that the comparator 51 produce an output pulse. The output from the comparator 51 is sent to a monostable multivibrator 52, which may be of the same type as the monostable multivibrators 28 and 31 of FIG. 3. The output from the monostable multivibrator 52 is fed to both the ON input for bistable multivibrator 53 and the OFF input for bistable multivibrator 54, the multivibrators 53 and 54 being of the same type as the bistable multivibrator 36. The output from the monostable multivibrator 52 is also fed back to the peak detecting integrator 40 to reset the peak detecting integrator 40 when the monostable multivibrator 52 is triggered. In the circuit described for the peak detector integrator, the multivibrator 52 output may be coupled through a diode to discharge the capacitor.

The output (ON side) of the bistable multivibrator 54 is gated with an "End of Scan Trigger" pulse in an AND gate 55, after which it is fed to the OFF input of the bistable multivibrator 53, the ON input to the bistable multivibrator 54 being fed with the "End of Scan Trigger" pulse after it has passed through a delay network 64. The output (ON side) of the bistable multivibrator 53 is applied to a conventional DC amplifier 57, and its amplified output signal is used to activate a relay solenoid 67 in "Climb" relay 66 to move relay contact arm 69 to a closed position in which a "Climb" command signal is sent to the autopilot.

The "Dive" channel is constructed in the same manner as the "Climb" channel and comprises a "Dive" AND gate 37, a peak detecting integrator 63, a comparator 62 having a preset trigger level 44, monostable multivibrator 61, bistable multivibrators 59 and 60, AND gate 56, DC amplifier 58, and a "Dive" relay 65 having a relay solenoid 68 and contact arm 70. It should be pointed out that although relays are illustrated as being used for generating the "Climb" and "Dive" command signals, the "Climb" and "Dive" command signals may be completely generated electronically, for example, by feeding the outputs from the multivibrators 53 and 59 to appropriate electronic (preferably transistorized) switching circuitry.

In the operation of the flight control logic of FIG. 5, when an object is present inside the scan profile, the return radar pulse from the receiver 24 is fed to the "Climb" gate 38 and the "Dive" gate 37. Since the bistable multivibrator 36 will maintain the "Climb" gate 38 open as long as the area within the template is being investigated, the return radar signal will pass through the "Climb" gate 38 and be registered in the peak detecting integrator 40. The flight control logic is arranged so that a predetermined number of return radar signals passing through the "Climb" gate 38 will indicate the presence of an object within the scan profile. In a preferred embodiment of the invention the trigger level on lead 43 to the comparator 51 is set so that the comparator 51 will produce an output when the peak detecting integrator 40 has built up that voltage corresponding to the passage of ten received radar pulses through the gate 38. After ten such pulses have been counted by the integrator 40, the voltage level will be sufficient to trigger the comparator 51, and the comparator 51 will then apply a trigger pulse to the monostable multivibrator 52. It should be appreciated that peak detector integrators 40 and 63 could be arranged so that a varying number of radar returns of different levels would cause the peak detector integrators to provide an output sufficient to trigger the comparators 51 and 62. In this situation a varying number of radar returns of different levels would be additive, and the comparators 51 and 62 would trigger monostable multivibrators 52 and 61 when the peak detectors 40 and 63 detected a sufficient cummulation of radar returns to reach the trigger level of comparators 51 and 62. After being triggered, the monostable multivibrator 52 resets the peak detecting integrator 40 to its initial condition to prepare it for registering the next ten pulses, which pass through the "Climb" gate 38. An output from the monostable multivibrator 52 also sets the bistable multivibrator 53 to the ON state and the bistable multivibrator 54 to the OFF state. When the bistable multivibrator 53 is turned ON, it produces an output which is amplified by the DC amplifier 57, and the amplified output signal causes the relay solenoid 67 to close the contact arm 69 and thereby generate a "Climb" command signal for the autopilot.

It is desired that the "Climb" command signal remain activated until a complete scan (either up or down) indicates that no object remains within the template, thereby preventing the intermittent application of the "Climb" command signal. Thus, when the antenna has reached the extremities of its scan, an "End of Scan Trigger" pulse is generated, for example, by allowing a member whose movement corresponds to that of the antenna, to trip a microswitch, and the resultant "End of Scan Trigger" pulse is applied to the AND gate 55. However, since the bistable multivibrator 54 has been placed in the OFF condition by the output from the monostable multivibrator 52, the "End of Scan Trigger" pulse will not be able to pass through the AND gate 55 and hence will not place the bistable multivibrator 53 in the OFF state. This will prevent termination of the "Climb" command signal. However, the "End of Scan Trigger" pulse is also applied to the delay network 64, and the delayed "End of Scan Trigger" pulse is applied to the ON input for the bistable multivibrator 54. This sets the bistable multivibrator 54 to the ON state, with the result that if, during the next scan of the antenna, the bistable multivibrator 54 is not returned to the OFF state due to an output pulse from the monostable multivibrator 52 (indicating a detected object within the scan profile), the next "End of Scan Trigger" pulse will pass through the AND gate 55 and will reset the bistable multivibrator 53 to the OFF state, thereby allowing the relay contact 69 to open and thus terminate the "Climb" command output signal.

The "Dive" channel portion of the flight control logic of FIG. 5 operates in the same manner as the "Climb" channel. Thus, when an object is detected outside of the scan profile (which is indicated by the accumulation in the peak detecting integrator 63 of ten return radar pulses or a cummulative level of radar pulses), the relay arm 70 is closed, and a "Dive" command signal is generated. It should be apparent that either a "Climb" command output or a "Dive" command output should be provided essentially at all times, and that the system should be controllably producing these outputs in order to approximately hold the path of the aircraft in accordance with the template of FIG. 1. Therefore, in the event that an output signal is not provided by either the "Climb" channel or the "Dive" channel, an output signal will be generated to indicate a failure of the system. Note, the arrangement of the relay contact arms 69 and 70 is such that the failure signal will be generated when the contact arms remain in their open, or unactivated, positions. Moreover, in the event that the logic circuitry would attempt to generate both a "Climb" and a "Dive" output signal at the same time (which is quite possible since one object might be detected inside the scan template and another outside the template), the "Climb" output will prevail due to the arrangement of the relays 66 and 65. This is true because when the relay contact 69 is closed, a "Climb" command signal is generated, and the application of voltage to the "Dive" command generating portion is prevented regardless of the position of the relay contact arm 70.

The system provided by the present invention possesses numerous advantages over prior art computing terrain avoidance systems in which the radar supplies range and angle information, computes the relative height of an obstacle, and issues an appropriate command based on the aircraft response capabilities. With the system of the present invention, if vertical downward winds suddenly cause the aircraft to accelerate downward, the ground immediately moves into the scan profile, and the aircraft is at once responding to a "Climb" command signal. Overshoot is minimized because the sloping front (line B) of the scan enables the aircraft to return rapidly to its set clearance altitude. Except when obstacles exist, the command signals are generated a very short distance in front of the aircraft in order to make possible very accurate altitude determinations. Thus, the aircraft is readily maintained in a low flight over ground terrain and automatically guided over any abrupt projections of the ground terrain.

Although the present invention has been shown and described with reference to a particular embodiment, nevertheless various changes and modifications obvious to those skilled in the art are deemed to be within the spirit, scope and contemplation of the invention.

What is claimed is:

1. In a radar system wherein the antenna scans a predetermined arc about a reference vector, an electrical network therefore to provide output pulses at predetermined variable times after a trigger pulse is applied thereto concurrent with the emission of a radar pulse, said predetermined variable times varying as a function of the antenna angle from said reference vector; said electrical network comprising first means for generating a first ramp voltage in response to the trigger pulse, means for varying the slope of said first ramp voltage as a function of said antenna angle from said reference vector, and means for generating a first output pulse when said first ramp voltage reaches a predetermined value, said first output pulse occurring at a time subsequent to the application of said trigger pulse which varies relatively to the slope of said first ramp voltage; a second means for generating a second ramp voltage in response to the trigger pulse, means for varying the slope of said second ramp voltage as a function of said antenna angle from said reference vector, and means for generating a second output pulse when said second ramp voltage reaches a predetermined value, said second output pulse occurring at a time subsequent to the application of said trigger pulse which varies relatively to the slope of said second ramp voltage.

2. In a radar system wherein the antenna scans at least a predetermined arc about a reference vector, an electical network therefore to provide output pulses at predetermined variable times after a trigger pulse is applied thereto concurrent with the emission of a radar pulse, said predetermined variable times varying as a function of antenna angle from said reference vector; the electrical network comprising first means for generating a first ramp voltage in response to the trigger pulse, means for varying the slope of said first ramp voltage as a function of said antenna angle from said reference vector, and means for generating a first output pulse when said first ramp voltage reaches a predetermined value, said first output pulse occurring at a time subsequent to the application of said trigger pulse which varies relatively to the slope of said first ramp voltage; a second means for generating a second ramp voltage in response to the trigger pulse, means for varying the slope of said second ramp voltage as a function of said antenna angle from said reference vector, and means for generating a second output pulse when said second ramp voltage reaches a predetermined value, said second output pulse occurring at a time subsequent to the application of said trigger pulse which varies relatively to the slope of said second ramp voltage; and means for producing a third output pulse a predetermined time after the application of said trigger pulse.

3. An electrical network for providing at least two output pulses at predetermined variable times after an input pulse is applied thereto comprising first means for generating a first pulse of predetermined duration in response to said input pulse, second means for generating a second pulse of predetermined duration in response to said input pulse, first integrating means for integrating said first pulse of predetermined duration to produce a first ramp voltage, second integrating means for integrating said second pulse of predetermined duration to produce a second ramp voltage, means for varying the time constant of said first integrating means to vary the slope of said first ramp voltage as a function of time in accordance with a predetermined pattern, means for varying the time constant of said second integrating means to vary the slope of said second ramp voltage as a function of time in accordance with a predetermined pattern, the rate of change of the slope of said first ramp voltage being different from the rate of change of the slope of said second ramp voltage, means for comparing said first ramp voltage with a voltage of predetermined magnitude and for generating an output pulse when said first ramp voltage equals said voltage of predetermined magnitude, and means for comparing said second ramp voltage with a voltage of preselected magnitude and for generating a second output voltage when said second ramp voltage equals said voltage of preselected magnitude.

4. An electrical network for providing output pulses at predetermined variable times after an input pulse is applied thereto comprising first means for generating a first ramp voltage in response to said input pulse, means for varying the slope of said first ramp voltage as a function of time in accordance with a predetermined pattern, means for generating a first output pulse when said first ramp voltage reaches a predetermined value, said first output pulse occurring at a time subsequent to the application of said input pulse which varies as a function of the rate of change of said first ramp voltage, second means for generating a second ramp voltage in response to said input pulse, means for varying the slope of said second ramp voltage as a function of time in accordance with a predetermined pattern, means for generating a second output pulse when said second ramp voltage reaches a preselected value, said second output pulse occurring at a time subsequent to the application of said input pulse which varies as a function of the rate of change of said second ramp voltage, and means for producing a third output pulse a predetermined time after the application of said input pulse.

5. An electrical network for providing output pulses of varying duration in accordance with a predetermined pattern, the duration of said output pulses changing at a first rate during a first interval of time, said duration changing at a second rate during a second interval of time, and said duration remaining constant during a third interval of time; said network comprising a bistable device for providing an output pulse while said bistable device remains in a first stable state, means for setting said bistable device to said first stable state in response to an input pulse, means for producing a first pulse at a predetermined time after said input pulse, said predetermined time varying at said first rate, means for producing a second pulse at a preselected time after said input pulse, said preselected time varying at said second rate, means for producing a third pulse at a constant time after said input pulse, said first pulse occurring first in time during said first time interval, said second pulse occurring first in time during said second time interval, said third pulse occurring first in time during said third time interval, and means for applying said first, second and third pulses to said bistable device to set said bistable device to its second stable state thereby terminating said output pulse.

6. An electrical network for providing output pulses of varying duration in accordance with a predetermined pattern, the duration of said output pulses changing at a first rate during a first interval of time, said duration changing at a second rate during a second interval of time, and said duration remaining constant during a third interval of time; said network comprising a bistable device for providing an output pulse while said bistable device remains in a first stable state, means for setting said bistable device to said first stable state in response to an input pulse, first means for generating a first ramp voltage in response to said input pulse, means for varying the slope of said first ramp voltage as a function of time in accordance with a predetermined pattern, means for generating a first pulse when said first ramp voltage reaches a predetermined value, said first pulse occurring at a time subsequent to the application of said input pulse which varies as a function of the rate of change of said first ramp voltage, second means for generating a second ramp voltage in response to said input pulse, means for varying the slope of said second ramp voltage as a function of time in accordance with a predetermined pattern, means for generating a second pulse when said second ramp voltage reaches a preselected value, said second pulse occurring at a time subsequent to the application of said input pulse which varies as a function of the rate of change of said second ramp voltage, means for producing a third pulse a predetermined time after the application of said input pulse, said first pulse occurring first in time during said first time interval, said second pulse occuring first in time during said second time interval, said third pulse occuring first in time during said third time interval, and means for applying said first, second and third pulses to said bistable device to set said bistable device to its second stable state thereby terminating said output pulse.

7. A terrain avoidance radar system for an airborne vehicle comprising means for sending radar signals into a predetermined region in front of said airborne vehicle to detect the presence of an obstacle in said predetermined region, at least a portion of said predetermined region comprising a scan profile, a portion of the boundary of said scan profile lying at a distance from said airborne vehicle which varies in accordance with its angular position with respect to said airborne vehicle, receiver means for receiving the return radar signals, flight control logic means connected to said receiver means and effective responsive to the receipt of reflected radar signals for producing flight control command signals to control the flight path of said airborne vehicle to avoid detected obstacles, a bistable device for controlling the generation of said flight control command signals in said flight control logic means, means for applying a trigger pulse to said bistable device to place said bistable device in a first stable state when a radar pulse is emitted into said predetermined region, variable time delay means for applying timing signals to said bistable device, said timing signals being changed in accordance with said variation of said portion of the boundary for said scan profile to maintain said bistable device in said first stable state as long as the area within said scan profile is being investigated, the duration of the time said bistable device is maintained in said first stable state being changed at a first rate during a first interval of time, said duration being changed at a second rate during a second interval of time, and said duration remaining constant during a third interval of time, said variable time delay means including means for producing a first pulse at a predetermined time after said trigger pulse, said predetermined time varying at said first rate, means for producing a second pulse at a preselected time after said trigger pulse, said preselected time varying at said second rate, means for producing a third pulse at a constant time after said trigger pulse, said first pulse occurring first in time during said first time interval, said second pulse occurring first in time during said second time interval, said third pulse occurring first in time during said third time interval, and means for applying said first, second and third pulses to said bistable device to place said bistable device in said second stable state.

8. A terrain avoidance radar system according to claim 7 wherein said flight control logic means comprises first gating means for passing received radar return signals when said bistable device is in said first stable state, second gating means for passing received radar return signals when said bistable device is in said second stable state, means for generating a first output signal in response to the passage of received radar signals through said first gating means, and means for generating a second output signal in response to the passage of received radar signals through said second gating means.

9. A terrain avoidance radar system according to claim 8 having means for causing the angle of the flight vector of said airborne vehicle to be increased with respect to the horizontal in response to said first output signal and means for causing the angle of the flight vector of said airborne vehicle to be decreased with respect to the horizontal in response to said second output signal.

10. A terrain avoidance radar system according to claim 8 wherein said first and said second output signals are produced in response to the passage of a predetermined number of received radar signals through said first and said second gating means.

11. A terrain avoidance radar system according to claim 8 and having means for maintaining said output signals at least until the completion of an entire scan of said predetermined region.

12. A terrain avoidance radar system according to claim 8 and having means for preventing the generation of said second output signal when said first output signal is generated.

13. A terrain avoidance radar system according to claim 8 and having means for generating a third output signal in the absence of both said first and second output signals.

14. A terrain avoidance radar system for an airborne vehicle comprising means for sending radar signals into a predetermined region in front of said airborne vehicle to detect the presence of an obstacle in said predetermined region, at least a portion of the boundary for said predetermined region lying at a distance from said airborne vehicle which varies as a function of its angular position with respect to said airborne vehicle, means for receiving the return radar signals, flight control logic means for deriving from the received radar signals flight control command signals to control the flight path of said airborne vehicle to avoid detected obstacles, a bistable device for controlling the generation of said flight control command signals in said flight control logic means, means for applying a trigger pulse to said bistable device to place said bistable device in a first stable state when a radar pulse is emitted into said predetermined region, variable time delay means for applying timing signals to said bistable device, said timing signals being changed in accordance with said variation of said portion of the boundary for said predetermined region to maintain said bistable device in said first stable state as long as the area within said predetermined region is being investigated, the duration of the time said bistable device is maintained in said first stable state being changed at a first rate during a first interval of time, said duration being changed at a second rate during a second interval of time, and said duration remaining constant during a third interval of time, said variable time delay means including first means for generating a first ramp voltage in response to said input pulse, means for varying the slope of said first ramp voltage as a function of time in accordance with a predetermined pattern, means for generating a first pulse when said first ramp voltage reaches a predetermined value, said first pulse occurring at a time subsequent to said trigger pulse which varies as a function of the rate of change of said first ramp voltage, second means for generating a second ramp voltage in response to said input pulse, means for varying the slope of said second ramp voltage as a function of time in accordance with a predetermined pattern, means for generating a second pulse when said second ramp voltage reaches a preselected value, said second pulse occurring at a time subsequent to said trigger pulse which varies as a function of the rate of change of said second ramp voltage, means for producing a third pulse a predetermined time after said trigger pulse, said first pulse occurring first in time during said first time interval, said second pulse occurring first in time during said second time interval, said third pulse occurring first in time during said third time interval, and means for applying said first, second and third pulses to said bistable device to place said bistable device in said second stable state.

15. In a radar system wherein radar signals are transmitted into a predetermined region to detect the presence of an object in said region, at least a portion of said region comprising a scan profile, a portion of the boundary of said scan profile lying at a distance from said radar system which varies in accordance with its angular position with respect to said radar system, an electrical network for electronically defining said portion of the boundary of said scan profile that comprises first means for generating a first ramp voltage in response to a trigger pulse applied thereto concurrent with the emission of a radar pulse, means for varying the slope of said ramp voltage as a function of the angular position of the antenna of said radar, means for generating a first timing pulse when said first ramp voltage reaches a predetermined value, said first timing pulse occurring at a time subsequent to the application of said trigger pulse which varies relatively to the slope of said first ramp voltage, a second means for generating a second ramp voltage in response to the trigger pulse, means for varying the slope of said ramp voltage as a function of the direction in which said radar pulse is transmitted, and means for generating a second timing pulse when said second ramp voltage reaches a predetermined value, said second timing pulse occurring at a time subsequent to the application of said trigger pulse which varies relatively to the slope of said second ramp voltage.

16. Apparatus as defined in claim 15 further including means for producing a third timing pulse at a predetermined time after the application of said trigger pulse.

17. Apparatus as defined in claim 16 further including a bistable device for providing an output voltage while said bistable device remains in a first stable state, means for setting said bistable device to said first stable state in response to said trigger pulse, and means for applying said first, second and third timing pulses to said bistable device to switch said bistable device to the second stable state.

References Cited

UNITED STATES PATENTS

| 2,839,748 | 6/1958 | Brockway. | |
| 2,965,894 | 12/1960 | Sweeney | 343—7 |
| 2,975,302 | 3/1961 | DeTraye | 307—88.5 |
| 3,020,402 | 2/1962 | Brodsky et al. | 343—7 |
| 3,075,188 | 1/1963 | Shelley et al. | 343—7 |

RODNEY D. BENNETT, Jr., Primary Examiner

T. H. TUBBESING, Assistant Examiner

U.S. Cl. X.R.

328—130